United States Patent Office
3,462,478
Patented Aug. 19, 1969

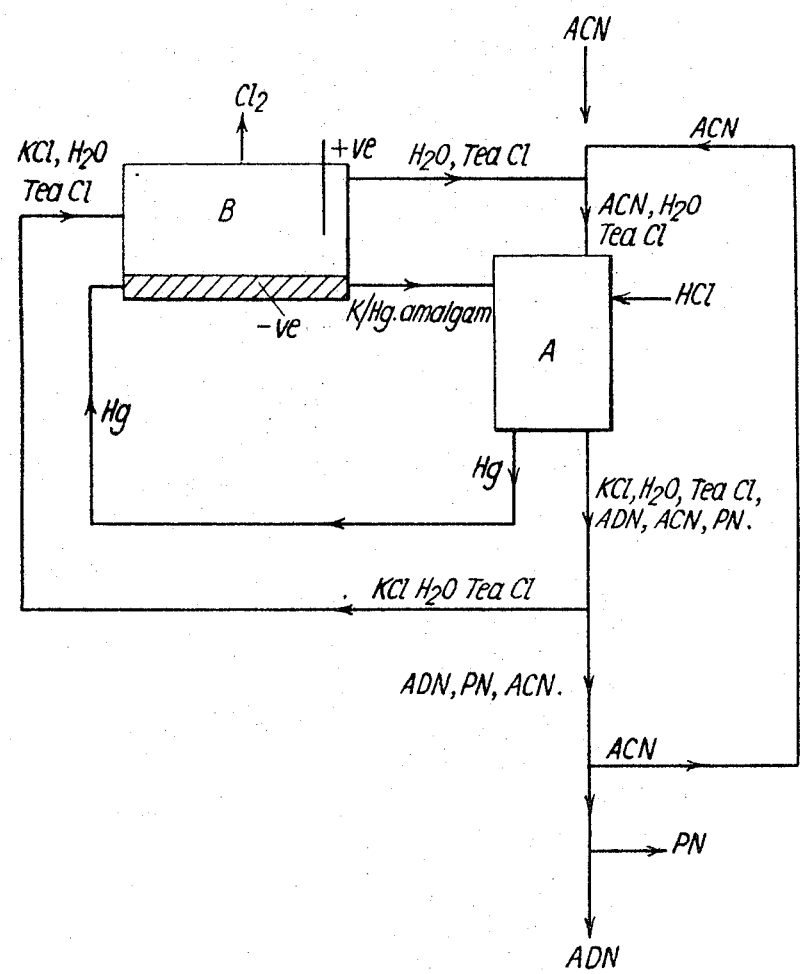

3,462,478
AMALGAM REDUCTION PROCESS FOR THE PRODUCTION OF ADIPONITRILE
Ralph Santorre Fanshawe, Runcorn, England, assignor to Imperial Chemical Industries Limited, London, England, a corporation of Great Britain
Filed Dec. 2, 1965, Ser. No. 511,211
Claims priority, application Great Britain, Feb. 25, 1965, 8,165/65
Int. Cl. C07c *121/26;* B01k *3/00*
U.S. Cl. 260—465.8        10 Claims

ABSTRACT OF THE DISCLOSURE

In the reduction of an organic compound with alkali metal or alkaline earth metal amalgam in aqueous medium in which the rise in pH is controlled by the addition of hydrochloric acid, especially the hydrodimerization of acrylonitrile to adiponitrile, the residual aqueous liquor, after removing the reduced organic compound, is electrolyzed using a mercury cathode so as to reduce the concentration of alkali or alkaline earth metal ions, to generate chlorine and to form alkali or alkaline earth metal amalgam with the mercury, and the so treated aqueous liquor is used as the aqueous medium in the further reduction of the organic compound. Optionally the spent amalgam is used as the cathode in the electrolysis step, and the reformed amalgam from the electrolysis step is used in the further reduction.

---

This invention relates to the reduction of organic compounds in an aqueous medium with an amalgam of an alkali metal or alkaline earth metal, and especially to the reductive dimerisation of compounds which are acceptors in Michael reactions. By the term "acceptors in Michael reactions" we mean compounds containing a group of general formula

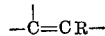

in which the R group activates the double bond. Examples of such compounds are listed in "Organic Name Reactions" by Krauch and Kunz 1964, John Wiley & Sons, page 315 and in "Name Reactions in Organic Chemistry" by Surrey 1961, Academic Press, on pages 173 and 174. Such compounds are referred to hereinafter as "Michael acceptors" and examples of Michael acceptors are α, β olefinic esters, amides and nitriles.

It has been suggested to reduce organic compounds (as in the hydrodimerisation of acrylonitrile to adiponitrile for example) with alkali metal amalgams in aqueous medium. In the hydrodimerisation of acrylonitrile for example potassium amalgam may be used and as the reduction proceeds potassium ions go into solution and raise the concentration of inorganic material in the aqueous medium to an undesirable extent. The pH also rises and it is desirable to control this. Additives may be present to control the pH or for other purposes and if the aqueous medium is to be discarded these additives must either be separated for re-use or lost. In copending U.S. application Ser. No. 511,252, a process is described for the reduction of organic compounds which comprises:

(a) Reacting the organic compounds in an aqueous medium with an alkali or alkaline earth metal amalgam.

(b) Separating some or all of the organic products of the reduction from the aqueous medium.

(c) Electrolysing the aqueous medium with a mercury cathode so as to reduce the concentration of alkali or alkaline earth metal ions in the aqueous medium and to reform alkali or alkaline earth metal amalgam.

(d) Re-using the aqueous medium after electrolysis in a further reduction process as in step (a) above.

In this way any additives which are present in the aqueous medium are available for re-use without separation.

We have found that if pH is controlled with hydrochloric acid then the aqueous medium after the reduction process may be electrolysed so as to provide chlorine as a by-product.

Accordingly the present invention provides a process as described above in which the pH of the reaction mixture in step (a) is controlled with hydrochloric acid and in which chlorine is produced in the electrolysis of step (c).

The hydrochloric acid may be used in gaseous form or in solution.

The mercury cathode after the electrolysis of step (c) above when it is enriched in alkali or alkaline earth metal may conveniently be used as the amalgam in step (d). Furthermore, the denuded amalgam from the reduction process (step a above) may conveniently be used as the cathode for step (c). Clearly the process of the present invention can be adapted for continuous cyclic operation in which the denuded amalgam from step (a) is used as the cathode in step (c) and subsequently used as the amalgam in step (d) and the aqueous reaction medium from step (a) may be used as the electrolyte in (c) and as the reaction medium in step (d). One or more cells and reaction vessels may be used in such a process. The process may be performed for example in an apparatus consisting of a reduction compartment containing the aqueous reaction medium and separated from an electrolytic cell containing an aqueous solution of alkali or alkaline earth metal ions by a layer of mercury which acts both as the cathode for the electrolytic cell and as an alkali or alkaline earth metal amalgam in the reduction compartment. Such apparatus is described in co-pending U.S. patent application No. 350,047.

Employing such apparatus the aqueous reaction medium may be placed together with the organic material to be reduced in the reduction compartment on one side of the mercury and an aqueous solution of an alkali metal or alkaline earth metal compound is placed in the electrolytic cell on the other side of the mercury. When the current is passed through the cell amalgam is formed and there is an effective transfer of cations from the cell to the reduction compartment through the mercury cathode. The reaction medium is withdrawn from the reduction compartment and after separation of organic materials is returned to the electrolytic cell to provide a source of amalgam forming metal. When the aqueous medium in the cell becomes depleted of alkali metal or alkaline earth metal ions it may be returned to the reduction compartment and re-used as the reaction medium for the reduction of a further proportion of organic material.

If desired the process described above may be operated continuously by continuous withdrawal of reaction medium from the reaction compartment, separation of product and unreacted starting material, return of the aqueous residue to the electrolytic cell, and recycle of the aqueous medium from the electrolytic cell to the reduction compartment.

The process of the invention is suitable for continuous operation in other arrangements of electrolytic cells and is not limited to the use of a single cell as described above. Alternatively a cell with a flowing mercury cathode may be used for the electrolysis.

In the reductive dimerisation of Michael acceptors the pH is preferably controlled between 2 and 13 with a more restricted preferred range between 5 and 11. The hydrochloric acid for pH control may be fed in continuously with automatic control. If hydrochloric acid and analgam are being fed into the same reaction vessel then they should preferably be fed in at different positions. If hydrochloric acid is used then chlorine ions are introduced into the reaction medium and subsequent electrolysis produces chlorine as a by-product at the anode.

The acid may be added during the reaction or mixed with the reaction medium before reacting if adequate pH control is thus obtained.

The process of the present invention is especially useful in the reductive dimerisation of Michael acceptors as hereinbefore defined. Examples of Michael acceptors are α, β olefinic esters, amides and nitriles especially those of acrylic acid or substituted derivatives thereof. The process of the present invention is especially applicable to the hydrodimerisation of acrylonitrile and substituted derivatives thereof to form adiponitrile or substituted derivatives thereof.

The efficiency of the process may be improved by the use of certain additives, which, in the hydrodimerisation of acrylonitrile for example, increase the yield of adiponitrile and reduce the amounts of undesirable by-product such as propionitrile or polymer which are formed. These additives may be salts capable of providing organic cations and especially alkylated cations in the aqueous medium. Such salts are described in detail in copending U.S. application Ser. No. 511,210. They include alkyl ammonium, phosphonium and sulphonium salts especially tetraalkyl ammonium salts; for example tetraethyl ammonium chloride. The additives should be chosen so that they remain in the aqueous medium after separation of the main organic products. They are thus present in solution during electrolysis and are available for re-use without further separation. They should of course be stable under the conditions of electrolysis.

Other additives may be present for instance, alcohol or solubilising agents provided that they do not interfere with the process either in the main reaction vessel or in the mercury cell and also a small concentration of a polymerisation inhibitor such as N-N-dimethyl-p-nitrosoaniline. Potassium and sodium amalgams are found to be particularly suitable for use in the process of the invention.

The separation of organics is conveniently performed by conventional means such as distillation or solvent extraction.

A cell having a flowing mercury cathode is conveniently used for electrolysis if chlorine is produced. The concentration of inorganic salts present in the aqueous medium is thus reduced and the aqueous medium is rendered suitable for re-use together with any additives which it contains.

Considered as a whole therefore, the process may produce chlorine as a by-product and permit the re-use of additives without separation.

An example of the invention will now be described.

EXAMPLE

The accompanying drawing is a diagram of a process according to the present invention. In the drawing Tea Cl stand for tetraethyl ammonium chloride, ADN stand for adiponitrile, ACN stands for aerylonitrile and PN stand for propionitrile.

Referring now to the drawing a mixture of water, (37 parts) acrylonitrile (2.5 parts) and tetraethyl ammonium chloride (8 parts) with a few p.p.m. of N-N-dimethyl nitroso-aniline is fed into a reaction vessel A (parts are by weight). Potassium-mercury amalgam (1900 parts; 0.2% K.) is also fed into the vessel. The aqueous medium reacts with the amalgam and as potassium ions go into solution, N hydrochloric acid is fed in as necessary to control the pH in the range 6–9. The reaction is carried out in the temperature range 0–40° C. Acrylonitrile is converted to adiponitrile in good yield, some remains unconverted, some is reduced to propionitrile and some converted to hydrotrimers and hydrotetramers. Denuded amalgam is taken from the reaction vessel and used as a flowing mercury cathode in a cell B. The organic part of the reaction mixture is isolated by distillation and solvent extraction. The organic part contains adiponitrile which is separated and purified (by distillation), unconverted acrylonitrile which is separated and fed back to the reaction vessel and propionitrile and hydrotrimers and tetramers of acrylonitrile. The other part contains potassium chloride, water and tetraethyl ammonium chloride and is fed into the cell B as electrolyte. In the cell B the concentration of potassium ions is reduced and potassium-mercury amalgam is regenerated at the cathode. The electrolyte after electrolysis consists mainly of water and tetramethyl ammonium chloride with some residual potassium or sodium chloride and is fed back into the reaction vessel A. At the anode of cell B chlorine is liberated and led off as a valuable by-product. Hydrochloric acid and acrylonitrile are the main reactants which are consumed in the reaction. Quantities of water, tetraethyl ammonium chloride, and mercury may be required for topping up. Temperature and pressure are not critical and ambient conditions may conveniently be used.

I claim:

1. In a process for the reductive dimerization of acrylonitrile to adiponitrile which comprises (a) reacting the acrylonitrile in a medium consisting essentially of water with an alkali or alkaline earth metal amalgam at a pH which is controlled between 2 and 13 by the addition of hydrochloric acid and (b) separating organic product from the aqueous residue, the improvement wherein (c) the aqueous residue is electrolyzed with a mercury cathode so as to reduce the concentration of alkali or alkaline earth metal ions, to generate chlorine at the anode and to form alkali or alkaline earth metal amalgam with the mercury, and (d) the so treated aqueous residue is reused in a further reductive dimerization of acrylonitrile with alkali or alkaline earth metal amalgam.

2. A process as claimed in claim 1 in which the mercury cathode after step (c) is used as the amalgam in step (d).

3. A process as claimed in claim 2 in which the spent amalgam from step (a) is used as a cathode in step (c).

4. A process as claimed in claim 3 in which the process is a continuous cyclic operation in which the spent amalgam after use in step (a) is used as the cathode in step (c) and subsequently used as the amalgam in step (d) and in which the aqueous medium after use in the reduction of step (a) is used as the electrolyte for step (c) and subsequently used as the reaction medium in step (d).

5. A process as claimed in claim 1 when performed in an apparatus consisting of a reduction compartment containing the aqueous reaction medium and separated from an electrolytic cell containing an equeous solution of alkali or alkaline earth metal ions by a layer of mercury which acts both as the cathode for the electrolytic cell and as alkali or alkaline earth metal amalgam in the reduction compartment.

6. A process as claimed in claim 1 in which a cell with a flowing mercury cathode is used in the electrolysis.

7. A process as claimed in claim 1 in which the pH is controlled between 5 and 11.

8. A process as claimed in claim 1 wherein said medium includes cations selected from the group consisting of alkylated ammonium, phosphonium and sulphonium cations.

9. A process as claimed in claim 8 in which the organic cations are tetraethyl or tetramethyl ammonium.

10. A process as claimed in claim 8 inclusive in which the anion associated with the organic cation is the chloride anion.

References Cited

UNITED STATES PATENTS 3,193,574   7/1965   Katchalsky et al.
3,356,708   12/1967  Davies et al.

JOSEPH P. BRUST, Primary Examiner

U.S. Cl. X.R.

204—73; 260—465.1, 485, 561